(12) United States Patent
Tanaka et al.

(10) Patent No.: US 11,915,496 B2
(45) Date of Patent: Feb. 27, 2024

(54) BODY INFORMATION ACQUISITION DEVICE

(71) Applicant: AISIN CORPORATION, Kariya (JP)

(72) Inventors: Godai Tanaka, Kariya (JP); Yoshiaki Tomatsu, Kariya (JP); Hirotaka Watanabe, Kariya (JP); Takahisa Hayakawa, Kariya (JP); Kazumichi Hara, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/652,760

(22) Filed: Feb. 28, 2022

(65) Prior Publication Data

US 2022/0284716 A1    Sep. 8, 2022

(30) Foreign Application Priority Data

Mar. 2, 2021    (JP) .................... 2021-032579

(51) Int. Cl.
*G06V 20/59*    (2022.01)
*G06V 40/10*    (2022.01)
(Continued)

(52) U.S. Cl.
CPC ............. *G06V 20/593* (2022.01); *G06N 5/04* (2013.01); *G06T 7/11* (2017.01); *G06T 7/70* (2017.01);
(Continued)

(58) Field of Classification Search
USPC ....................................................... 382/103
See application file for complete search history.

(56) References Cited

U.S. PATENT DOCUMENTS

| 8,135,209 B2* | 3/2012 | Ikeda .................... G06V 40/103 |
| | | 382/103 |
| 8,437,506 B2* | 5/2013 | Williams .............. A63F 13/213 |
| | | 348/46 |

(Continued)

FOREIGN PATENT DOCUMENTS

JP    2019-189101 A    10/2019

OTHER PUBLICATIONS

Manuel Martin et al,, Real Time Driver Body Pose Estimation for Novel Assistance Systems,2017,IEEE 20th International Conference on Intelligent Transportation Systems (ITSC) (Year: 2017).*

(Continued)

*Primary Examiner* — Ishrat I Sherali
(74) *Attorney, Agent, or Firm* — Oblon, McClelland, Maier & Neustadt, L.L.P.

(57) ABSTRACT

A body information acquisition device includes: a skeleton point detection unit configured to detect a skeleton point of a person included in a captured image; a body information acquisition unit configured to acquire body information of the person based on detection of the skeleton point; and an imaging state determination unit configured to determine whether an imaging state of the person reflected in the captured image corresponds to a specific imaging state specified based on a predetermined evaluation index value, in which the body information acquisition unit does not acquire the body information based on the detection of the skeleton point when the imaging state corresponds to the specific imaging state.

6 Claims, 10 Drawing Sheets

(51) Int. Cl.
  *G06V 40/20* (2022.01)
  *G06V 10/60* (2022.01)
  *G06T 7/70* (2017.01)
  *G06N 5/04* (2023.01)
  *G06T 7/11* (2017.01)

(52) U.S. Cl.
  CPC ............ *G06V 10/60* (2022.01); *G06V 40/103* (2022.01); *G06V 40/23* (2022.01); *G06T 2207/10152* (2013.01); *G06T 2207/30196* (2013.01); *G06T 2207/30268* (2013.01)

(56) References Cited

U.S. PATENT DOCUMENTS

| | | | | |
|---|---|---|---|---|
| 8,542,910 | B2* | 9/2013 | Leyvand | G06F 3/017 |
| | | | | 382/106 |
| 9,047,507 | B2* | 6/2015 | Gurman | G06V 40/10 |
| 9,355,305 | B2* | 5/2016 | Tanabiki | G06V 40/23 |
| 10,946,827 | B2* | 3/2021 | Yoshikawa | B60R 21/01552 |
| 11,380,009 | B2* | 7/2022 | Tanaka | G06V 20/593 |
| 2008/0169914 | A1* | 7/2008 | Albertson | G08B 21/06 |
| | | | | 340/425.5 |
| 2015/0116517 | A1* | 4/2015 | Kinoshita | H04N 23/611 |
| | | | | 348/208.6 |
| 2019/0329671 | A1 | 10/2019 | Tanaka | |
| 2020/0090299 | A1* | 3/2020 | Uno | G06T 3/0031 |
| 2020/0278743 | A1* | 9/2020 | Hiroki | G07C 5/02 |
| 2021/0312202 | A1* | 10/2021 | Osawa | G06T 7/215 |
| 2022/0114817 | A1* | 4/2022 | Gronau | G06V 10/454 |

OTHER PUBLICATIONS

Hannan, M.A.; Hussain, A.; Samad, S.A. System Interface for an Integrated Intelligent Safety System (ISS) for Vehicle Applications. Sensors 2010, 10, 1141-1153. https://doi.org/10.3390/s100201141 (Year: 2010).*

Long Liu et al., Driving Behavior Tracking and Recognition Based on Multisensors Data Fusion, IEEE Sensors Journal, vol. 20, No. 18, Sep. 15, 2020 (Year: 2020).*

Farmer et al., Occupant classification system for automotive airbag suppression,2003, IEEE Computer Society Conference on Computer Vision and Pattern Recognition (Year: 2003).*

* cited by examiner

BODY INFORMATION ACQUISITION DEVICE

CROSS REFERENCE TO RELATED APPLICATIONS

This application is based on and claims priority under 35 U.S.C. § 119 to Japanese Patent Application 2021-032579, filed on Mar. 2, 2021, the entire content of which is incorporated herein by reference.

TECHNICAL FIELD

This disclosure relates to a body information acquisition device.

BACKGROUND DISCUSSION

In the related art, there is a body information acquisition device that detects skeleton points of a person included in a captured image to acquire body information of the person whose image is captured. For example, an occupant information determination device disclosed in JP 2019-189101A (Reference 1) captures an image of an occupant in a vehicle to detect a head of the occupant serving as skeleton points of the occupant. Further, the occupant information determination device detects a size of the head as a body size based on the skeleton points of the occupant. In this manner, a physique and a posture of the occupant are determined as body information of the occupant whose image is captured.

In this example of the related art, a seat load of the occupant seated on a seat of the vehicle is detected while the skeleton points are detected as described above. For example, when the skeleton points cannot be detected from the captured image in such as a case where a field of view of a camera is blocked or a case where a body of the occupant deviates from an angle of view, the physique and the posture of the occupant are determined based on the seat load.

However, even if the image can be captured, accuracy of detecting the skeleton points based on the captured image may be reduced. In such a case, there is a problem that the body information of the person as a target cannot be accurately acquired.

SUMMARY

A body information acquisition device includes a skeleton point detection unit configured to detect a skeleton point of a person included in a captured image; a body information acquisition unit configured to acquire body information of the person based on detection of the skeleton point; and an imaging state determination unit configured to determine whether an imaging state of the person reflected in the captured image corresponds to a specific imaging state specified based on a predetermined evaluation index value, and the body information acquisition unit does not acquire the body information based on the detection of the skeleton point when the imaging state corresponds to the specific imaging state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a body information acquisition device will be described with reference to drawings.

Figure 1:
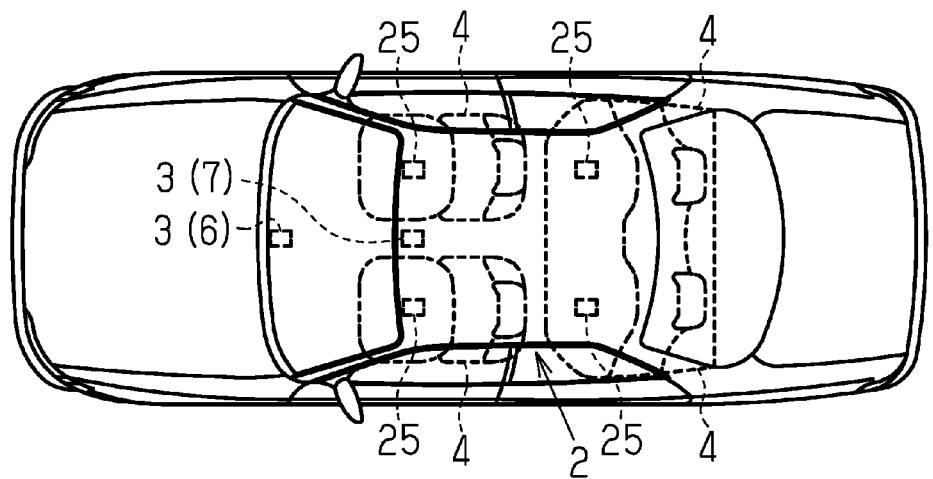
FIG. 1 is a schematic configuration view of a vehicle.
Figure 2:
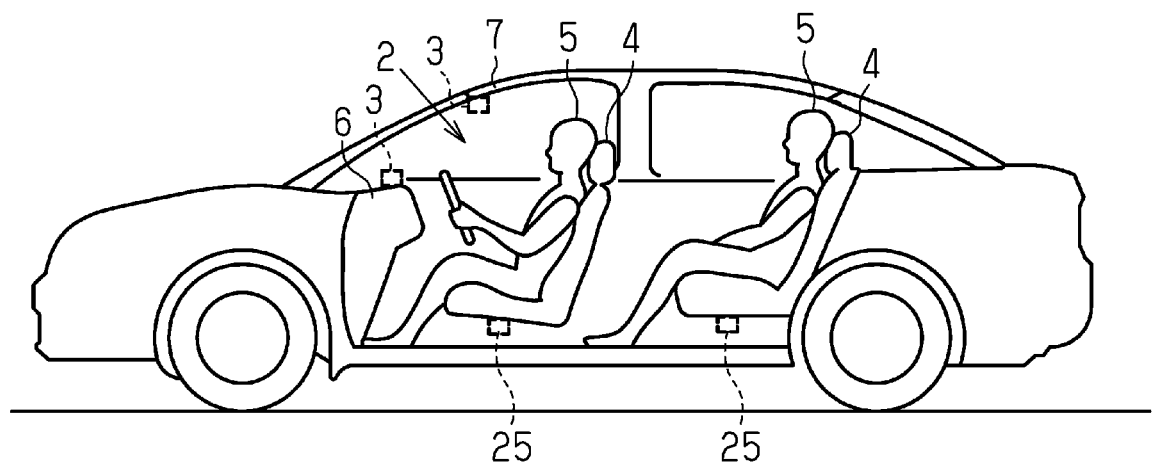
FIG. 2 is an explanatory view showing an occupant seated on a seat of the vehicle and a camera that captures an image of the occupant.

As shown in FIGS. 1 and 2, a vehicle 1 of the embodiment is provided with a camera 3 that captures an image inside a vehicle cabin 2 of the vehicle. Specifically, the vehicle 1 in the embodiment has a configuration of so-called four-door sedan in which seats 4 of two rows including a front row and a rear row are disposed in the vehicle cabin 2 of the vehicle. An infrared camera or the like is used as the camera 3. In the vehicle 1 of the present embodiment, the camera 3 is installed at a position at which images of occupants 5 seated on the seats 4 are captured from a front side (left side in each drawing) of the vehicle cabin 2, for example, at a center console 6 or an overhead console 7.

Figure 3:
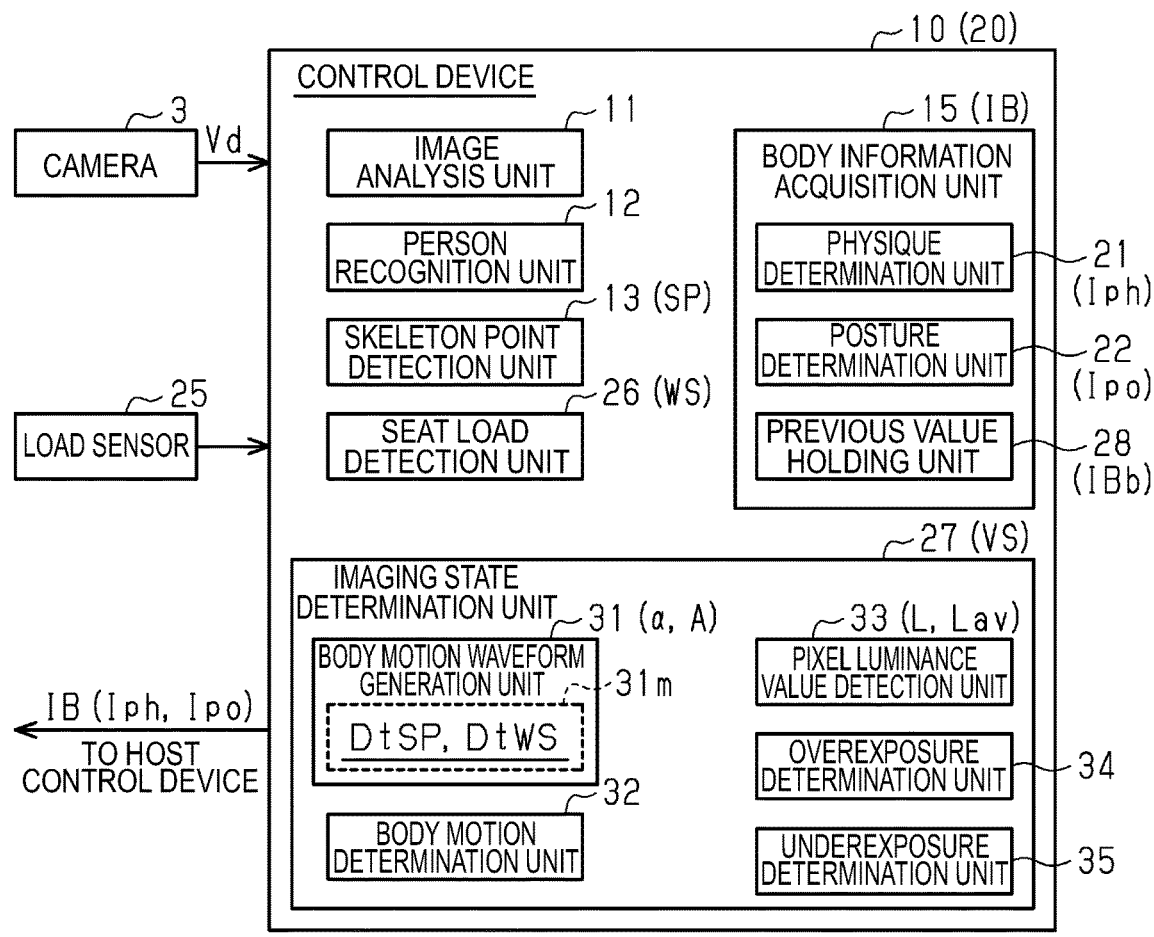
FIG. 3 is a block diagram showing a schematic configuration of a control device that functions as a body information acquisition device.

As shown in FIG. 3, in the vehicle 1 of the present embodiment, a captured image Vd inside the vehicle cabin 2 captured by the camera 3 is input into a control device 10. The control device 10 includes an image analysis unit 11 that analyzes the captured image Vd, and a person recognition unit 12 that operates in cooperation with the image analysis unit 11 to recognize, based on a result of the image analysis, persons in the vehicle cabin 2 reflected in the captured image Vd, that is, the occupants 5 of the vehicle 1.

Figure 4:
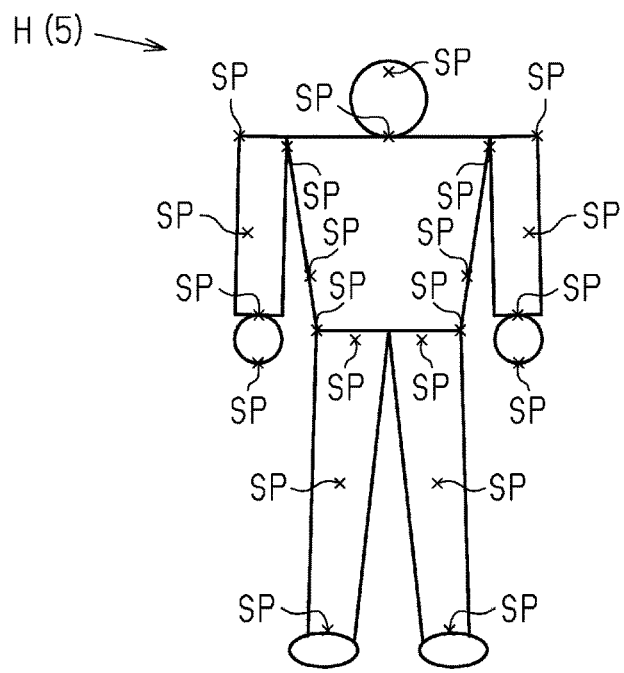
FIG. 4 is an explanatory diagram showing skeleton points of a person.

Further, as shown in FIGS. 3 and 4, the control device 10 of the present embodiment includes a skeleton point detection unit 13 that operates in cooperation with the image analysis unit 11 and the person recognition unit 12 to detect skeleton points SP of a person H included in the captured image Vd based on the result of the image analysis. That is, the skeleton points SP are unique points characterizing a body of the person H, such as points at joints or points on a body surface, and correspond to, for example, a head, a neck, shoulders, armpits, elbows, wrists, fingers, waist, hip joints, buttock, knees, and ankles. Further, the control device 10 of the present embodiment includes a body information acquisition unit 15 that acquires body information IB of the person H reflected in the captured image Vd, that is, the occupant 5 of the vehicle 1, based on detection of the skeleton points SP by the skeleton point detection unit 13. Thus, the control device 10 of the present embodiment has a function of being a body information acquisition device 20.

Specifically, the person recognition unit 12 of the present embodiment uses an inference model, which is generated by machine learning, to perform recognition processing of the person H. Then, the skeleton point detection unit 13 also uses an inference model, which is generated by machine learning, to perform detection processing of the skeleton points SP.

The body information acquisition unit 15 of the present embodiment includes a physique determination unit 21 that determines a physique of the person H who is the occupant 5 of the vehicle 1 as body information of the person H reflected in the captured image Vd. Specifically, the physique determination unit 21 determines whether the occupant 5 seated on the seat 4 of the vehicle 1 is an "adult", a "petite adult" such as a female, or a "child". Further, the control device 10 of the present embodiment outputs the body information IB of the occupant 5 acquired in the body information acquisition unit 15 to a host control device (not shown). Thus, in the vehicle 1 of the present embodiment, for example, deployment control of an airbag and the like are performed based on physique information Iph of the occupant 5 included in the body information IB.

The body information acquisition unit 15 of the present embodiment further includes a posture determination unit 22 that determines a posture of the person H who is the occupant 5 of the vehicle 1 as the body information IB of the person H reflected in the captured image Vd. The control device 10 of the present embodiment also outputs posture information Ipo of the occupant 5, which is acquired based on a result of posture determination performed by the posture determination unit 22, to the host control device (not shown) as the body information IB of the occupant 5. Thus, in the vehicle 1 of the present embodiment, for example, the deployment control of the airbag, permission determination of automatic driving control, or the like are performed based on the posture information Ipo of the occupant 5.

As shown in FIGS. 1 to 3, the vehicle 1 of the present embodiment also includes load sensors 25 provided below each seat 4. The load sensors 25 are disposed, for example, at four corners below each seat cushion or at two corner portions located at inner sides in a vehicle width direction. The control device 10 of the present embodiment includes a seat load detection unit 26 that detects a seat load WS of the occupant 5 seated on the seat 4 based on an output signal of the load sensor 25.

In the control device 10 of the present embodiment, the seat load WS detected by the seat load detection unit 26 is also used for acquiring the body information IB by the body information acquisition unit 15. Thus, the control device 10 of the present embodiment can acquire the body information IB of the occupant 5 more accurately.

Acquisition Control of Body Information

Next, the acquisition control of the body information IB performed by the control device 10 of the present embodiment, specifically, physique determination of the occupant 5 will be described.

As shown in FIG. 3, the control device 10 of the present embodiment includes an imaging state determination unit 27 that determines an imaging state VS of the person H reflected in the captured image Vd when the body information IB of the person H is acquired based on the detection of the skeleton points SP. Specifically, in the control device 10 of the present embodiment, an evaluation index value for evaluating the imaging state VS is set in advance for the captured image Vd of the person H whose body information IB is to be acquired. The imaging state determination unit 27 of the embodiment is configured to determine whether the imaging state VS of the occupant 5 reflected in the captured image Vd corresponds to a specific imaging state specified based on the evaluation index value of the predetermined imaging state VS.

In the control device 10 of the present embodiment, a determination result from the imaging state determination unit 27 is input into the body information acquisition unit 15. Then, the body information acquisition unit 15 of the present embodiment is configured to change, based on the determination result of the imaging state VS, a processing procedure for acquiring the body information IB of the occupant 5 reflected in the captured image Vd, specifically, a processing procedure for determining the physique by the physique determination unit 21.

Figure 5:
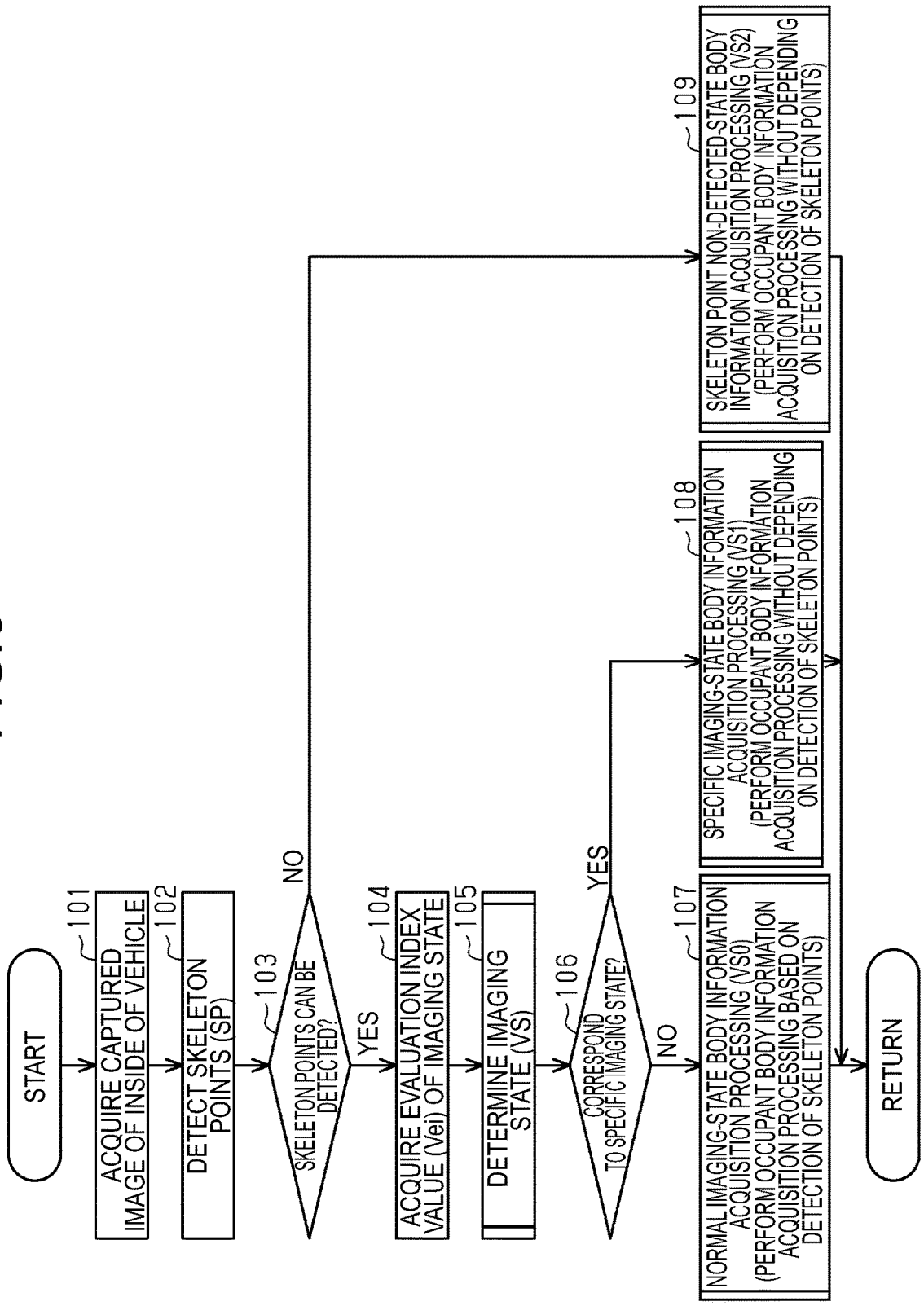
FIG. 5 is a flowchart showing a procedure of imaging state determination processing based on a predetermined evaluation index value.

That is, as shown in a flowchart of FIG. 5, when the control device 10 of the present embodiment acquires the captured image Vd of the inside of the vehicle cabin 2 (step 101), the skeleton points SP of the occupant 5 included in the captured image Vd is detected by performing image analysis (step 102). Next, the control device 10 determines whether the detection processing of the skeleton points SP in step 102 is correctly performed (step 103). In the control device 10 of the present embodiment, a situation in which the detection processing of the skeleton points SP is not correctly performed corresponds to a situation in which the skeleton points SP of the occupant 5 cannot be detected from the captured image Vd in such as a case where a field of view of the camera 3 is blocked or a case where the body of the occupant 5 deviates from an angle of view of the camera 3. Then, when it is determined that the skeleton points SP of the occupant can be detected (step 103: YES), the control device 10 acquires an evaluation index value Vei for the imaging state VS of the occupant 5 reflected in the captured image Vd acquired in step 101 (step 104). Then, based on the evaluation index value Vei acquired in step 104, the control device 10 of the present embodiment determines whether the imaging state VS of the occupant 5 reflected in the captured image Vd corresponds to a specific imaging state VS1 (step 105).

Next, when a result of the imaging state determination in step 105 indicates that the imaging state does not correspond to the specific imaging state VS1 (step 106: NO), the control device 10 of the present embodiment performs acquisition processing of the body information IB corresponding to a normal imaging state VS0 (step 107). When the result of the imaging state determination in step 105 indicates that the imaging state corresponds to the specific imaging state VS1 (step 106: YES), the control device 10 performs acquisition processing of the body information IB corresponding to the specific imaging state VS1 (step 108).

When it is determined in step 103 that the skeleton points SP of the occupant cannot be detected (step 103: NO), the control device 10 of the present embodiment does not perform processing in steps 104 to 108. Then, in this case, acquisition processing of the body information IB corresponding to a case where the skeleton points SP are in a non-detected state VS2 is performed (step 109).

Specifically, the control device 10 of the present embodiment performs, as normal imaging-state body information acquisition processing of step 107, the acquisition processing of the body information IB based on the detection of the skeleton points SP performed in step 102. Further, the control device 10 performs, as specific imaging-state body information acquisition processing of step 108, the acquisition processing of the body information IB that does not depend on the detection of the skeleton points SP in step 102. That is, when it is determined in step 106 that the imaging state corresponds to the specific imaging state VS1 (step 106: YES), the acquisition processing of the body information IB based on the detection of the skeleton points SP is not performed. The control device 10 of the present embodiment also performs the acquisition processing of the body information IB that does not depend on the detection of the skeleton points SP in skeleton point non-detected-state body information acquisition processing of step 109.

Figure 6:
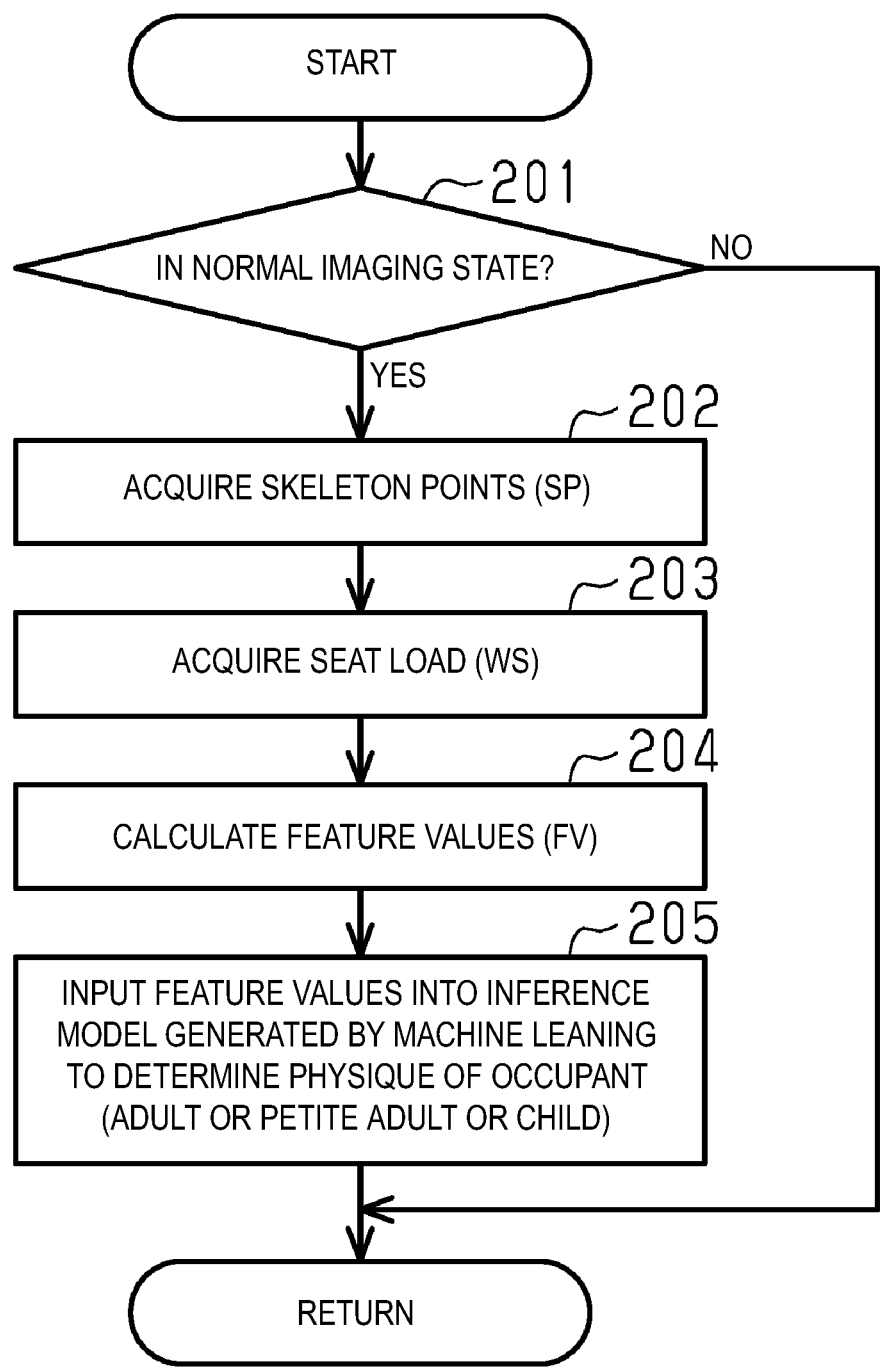
FIG. 6 is a flowchart showing an example of body information acquisition processing performed in a normal imaging state.

Specifically, as shown in FIG. 3 and a flowchart of FIG. 6, in the control device 10 of the present embodiment, when the imaging state corresponds to the normal imaging state VS0 (step 201: YES), the body information acquisition unit 15 acquires the skeleton points SP of the occupant 5 from the skeleton point detection unit 13 (step 202). The body information acquisition unit 15 acquires the seat load WS of the occupant 5 reflected in the captured image Vd from the seat load detection unit 26 (step 203). The body information acquisition unit 15 calculates, based on the skeleton points SP acquired in step 202 and the seat load WS of the occupant 5 acquired in step 203, feature values FV of the occupant 5 whose body information IB is acquired (step 204). Then, the body information acquisition unit 15 of the embodiment performs acquisition processing of the body information IB based on the feature values FV of the occupant 5 calculated in step 204 (step 205).

Specifically, the body information acquisition unit 15 of the present embodiment calculates the feature values FV based on positions of the skeleton points SP of such as the head and the shoulders of the occupant 5 detected from the captured image Vd. The body information acquisition unit 15 calculates the feature value FV based on a body size indicated by a plurality of skeleton points SP, such as a shoulder width of the occupant 5. Then, the body information acquisition unit 15 of the present embodiment calculates the feature value FV based on the seat load WS of the occupant 5. Then, in the body information acquisition unit 15 of the present embodiment, these feature values FV are input into an inference model generated by machine learning, and thereby the physique determination unit 21 performs the physique determination of the occupant 5.

More specifically, the control device 10 of the present embodiment periodically performs the processing in steps 101 to 109 shown in FIG. 5. That is, the control device 10 of the present embodiment periodically detects the skeleton points SP by the skeleton point detection unit 13, acquires the body information IB by the body information acquisition unit 15, and determines the imaging state VS by the imaging state determination unit 27.

As shown in FIG. 3, in the control device 10 of the present embodiment, the body information acquisition unit 15 includes a previous value holding unit 28 that holds the body information IB of the person H acquired in a previous period as a previous value IBb of the body information IB. As the skeleton point non-detected-state body information acquisition processing (see FIG. 5, step 109), the body information acquisition unit 15 of the present embodiment is configured to set the previous value IBb of the body information IB as the body information IB acquired in a current period.

Figure 7:
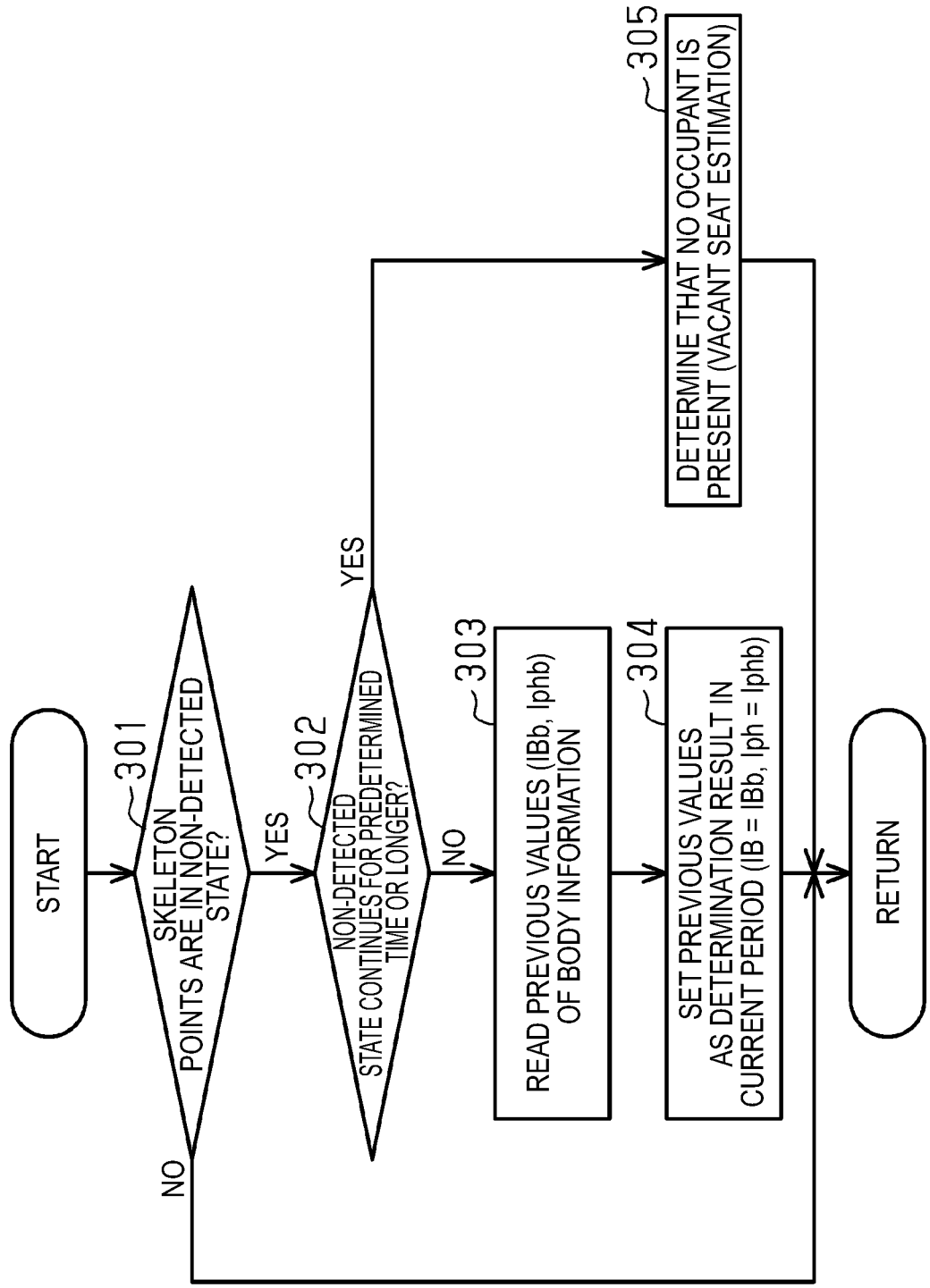
FIG. 7 is a flowchart showing an example of the body information acquisition processing performed when the skeleton points cannot be detected.

Specifically, as shown in a flowchart of FIG. 7, when the skeleton points SP are in the non-detected state VS2 (step 301: YES), the body information acquisition unit 15 of the present embodiment first determines whether the non-detected state VS2 continues for a predetermined time or longer (step 302). When the body information acquisition unit 15 determines that the non-detected state VS2 of the skeleton points SP does not continue for the predetermined time or longer (step 302: NO), the body information acquisition unit 15 reads the previous value IBb of the body information IB from the previous value holding unit 28 (step 303). Then, the body information acquisition unit 15 of the present embodiment acquires the previous value IBb as the body information IB of the occupant 5 in the current period (step 304).

Specifically, in the body information acquisition unit 15 of the present embodiment, when the skeleton points SP are in the non-detected state VS2, the physique determination unit 21 acquires a result of the physique determination performed in a previous period, that is, a previous value 1 phb of the physique information Iph from the previous value holding unit 28. The physique determination unit 21 of the embodiment is configured to take over the result of the physique determination performed in the previous period to the physique determination in the current period using the previous value 1 phb as the physique information Iph of the occupant 5 acquired in the current period.

When it is determined in step 302 that the non-detected state VS2 of the skeleton points SP continues for the predetermined time or longer (step 302: YES), the body information acquisition unit 15 of the present embodiment does not perform processing in steps 303 and 304. Then, it is estimated that there is no occupant 5 whose body information IB is acquired on the seat 4 reflected in the captured image Vd, that is, the seat 4 is a vacant seat (step 305).

More specifically, in the control device 10 of the present embodiment, "magnitude of body motion" of the occupant 5 reflected in the captured image Vd of the vehicle cabin 2 is set as the evaluation index value Vei of the imaging state VS. The imaging state determination unit 27 of the embodiment is configured to determine the imaging state VS based on the "magnitude of body motion" of the occupant 5 (see FIG. 5, steps 104 and 105).

Specifically, as shown in FIG. 3, the imaging state determination unit 27 of the present embodiment is provided with a body motion waveform generation unit 31 that generates a body motion waveform α of the person H reflected in the captured image Vd. Further, the imaging state determination unit 27 of the present embodiment includes a body motion determination unit 32 that determines whether the imaging state corresponds to the specific imaging state VS1 using the "magnitude of body motion" represented by the body motion waveform α as the evaluation index value Vei of the imaging state VS.

Figure 8:
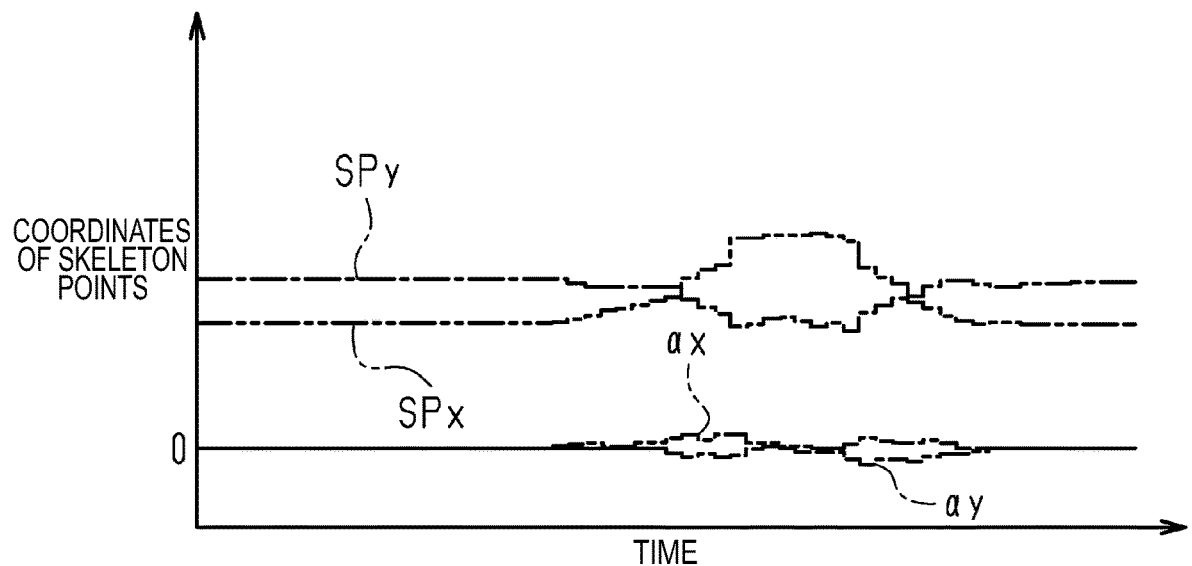
FIG. 8 is an explanatory diagram of a body motion waveform used for an evaluation index value of an imaging state.

As shown in FIGS. 3 and 8, the body motion waveform generation unit 31 of the present embodiment holds time-series data DtSP of the skeleton points SP periodically detected by the skeleton point detection unit 13 in a storage area 31m of the body motion waveform generation unit. The body motion waveform generation unit 31 holds time-series data DtWS of the seat load WS periodically detected by the seat load detection unit 26 in the storage area 31m. Then, the body motion waveform generation unit 31 of the present embodiment generates, based on these time-series data DtSP and DtWS, the body motion waveform α of the occupant 5 reflected in the captured image Vd of the inside of the vehicle cabin 2.

As shown in FIG. 8, in the body motion waveform generation unit 31 of the present embodiment, the time-series data DtSP of the skeleton points SP is represented by, for example, an X coordinate SPx and a Y coordinate SPy in the captured image Vd in which the occupant 5 is reflected. In addition, the body motion waveform generation unit 31 of the present embodiment performs frequency analysis on the time-series data DtSP of the skeleton points SR Specifically, filtering processing is performed to extract body motion frequency components ax and ay included in the time-series data DtSP of the skeleton points SP. Further, the body motion waveform generation unit 31 performs the same filtering processing on the time-series data DtWS of the seat load WS. Thus, the body motion waveform generation unit 31 of the present embodiment is configured to generate the body motion waveform α of the occupant 5.

Figure 9:
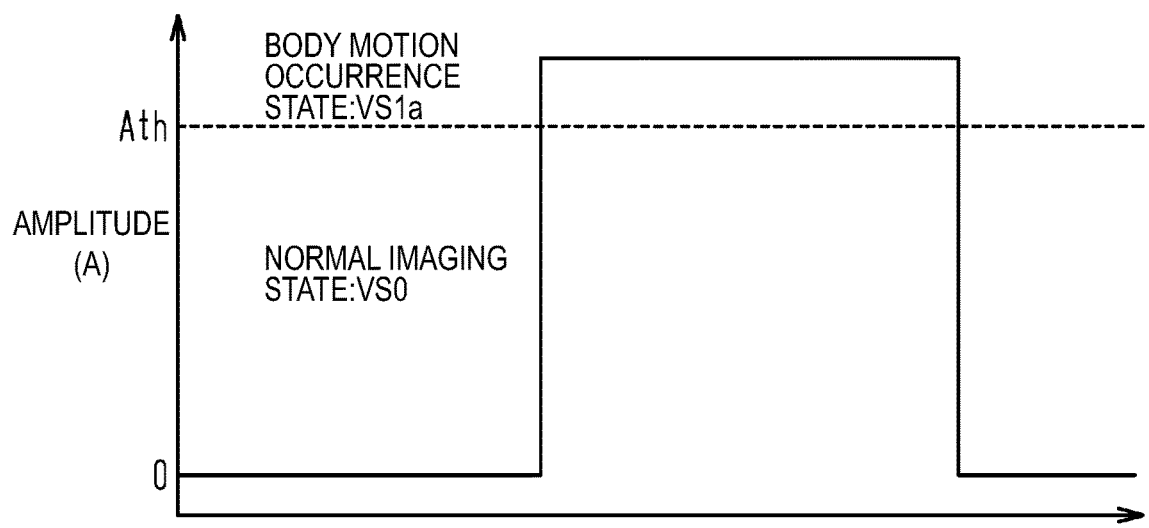
FIG. 9 is an explanatory diagram of body motion determination based on magnitude of body motion shown in the body motion waveform.

As shown in FIGS. 3 and 9, the body motion determination unit 32 of the present embodiment acquires amplitude A of the body motion waveform α output from the body motion waveform generation unit 31. Specifically, the body motion determination unit 32 of the present embodiment performs digital processing on the body motion waveform α of the occupant 5 to acquire the amplitude A of the body motion waveform α. Further, the body motion determination unit 32 compares the amplitude A with a predetermined body motion threshold value Ath. When the amplitude A of the body motion waveform α is equal to or larger than the body motion threshold value Ath, the body motion determination unit 32 of the present embodiment is configured to determine that the imaging state VS of the occupant 5 reflected in the captured image Vd is a body motion occurrence state VS1a corresponding to the specific imaging state VS1.

Figure 10:
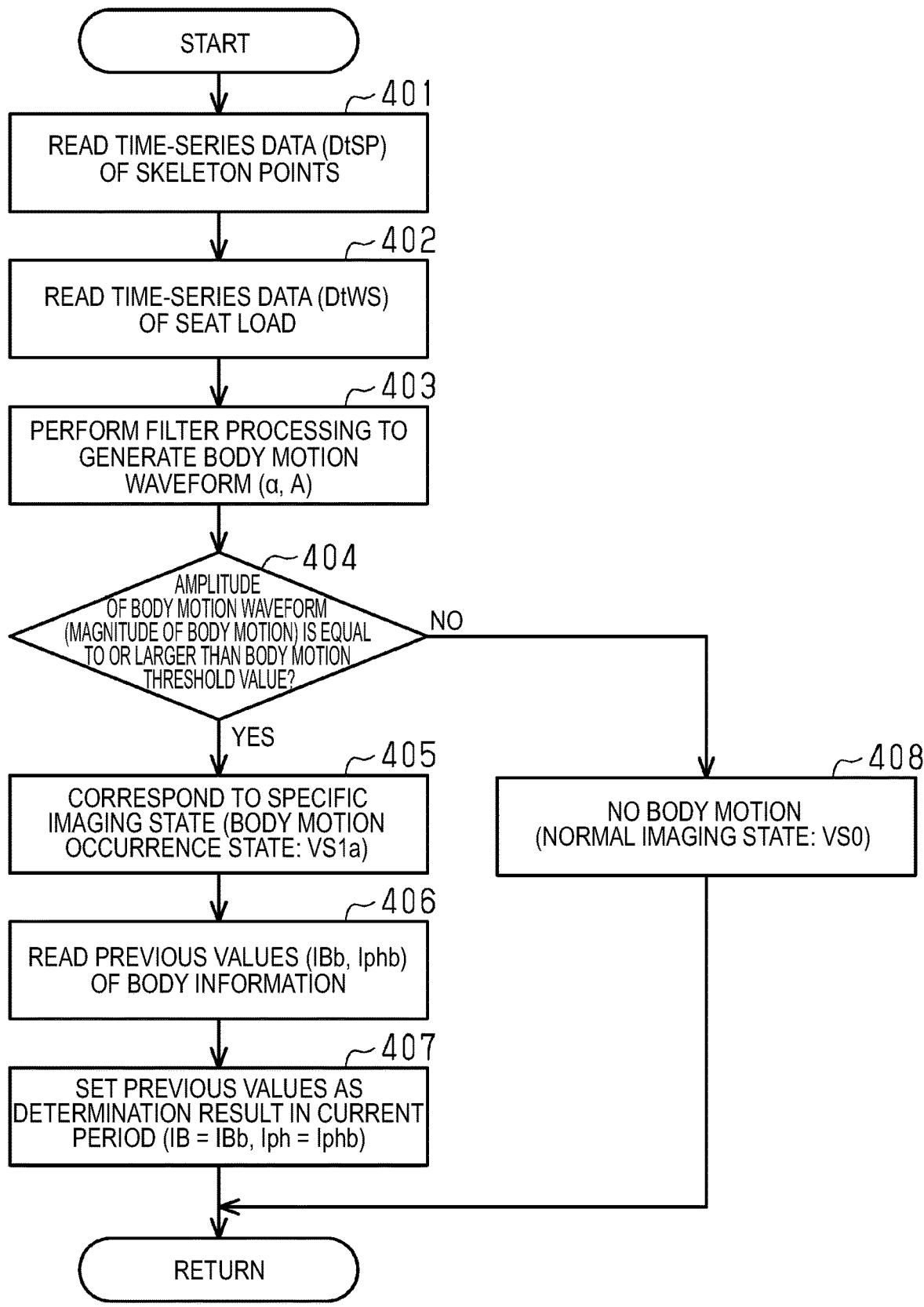
FIG. 10 is a flowchart showing a processing procedure of body motion determination and an example of the body information acquisition processing performed when it is determined, based on the magnitude of body motion, that the imaging state corresponds to a specific imaging state.

That is, as shown in a flowchart of FIG. 10, the imaging state determination unit 27 of the present embodiment reads the time-series data DtSP and DtWS of the skeleton points SP of the occupant 5 and the seat load WS (step 401 and step 402). Then, the imaging state determination unit 27 generates the body motion waveform α of the occupant 5 based on these time-series data DtSP and DtWS (step 403).

In the control device 10 of the present embodiment, the body motion waveform α of the occupant 5 based on the time-series data DtSP of the skeleton points SP is prioritized. The body motion waveform α of the occupant 5 based on the time-series data DtWS of the seat load WS serves as a supplement thereto.

Further, the imaging state determination unit 27 determines whether the amplitude A of the body motion waveform α generated in step 403 is equal to or larger than the body motion threshold value Ath (step 404). Then, when the amplitude A of the body motion waveform α is equal to or larger than the body motion threshold value Ath (A Ath, step 404: YES), the imaging state determination unit 27 determines that the imaging state VS of the occupant 5 is the body motion occurrence state VS1a in which a large body motion occurs in the occupant 5 (step 405).

That is, the amplitude A of the body motion waveform α indicates the "magnitude of body motion" of the occupant 5 reflected in the captured image Vd as it is. When the "magnitude of body motion" indicated by the body motion waveform α is in a large state, that is, in the body motion occurrence state VS1a, accuracy of detecting the skeleton points SP by the image analysis may be reduced.

Based on this point, in the control device 10 of the present embodiment, the body motion waveform generation unit 31 and the body motion determination unit 32 provided in the imaging state determination unit 27 detect that the imaging state VS of the occupant 5 reflected in the captured image Vd is in such a body motion occurrence state VS1a. Then, the control device 10 of the present embodiment is configured to perform, based on the result of the imaging state determination performed by the imaging state determination unit 27, the specific imaging-state body information acquisition processing (see FIG. 5, step 108) that does not depend on the detection of the skeleton points SP.

More specifically, in the control device 10 of the present embodiment, in a case of such a body motion occurrence state VS1a, the body information acquisition unit 15 reads the body information IB of the person H acquired in the previous period, that is, the previous value IBb of the body information IB (step 406). Then, the body information acquisition unit 15 of the present embodiment sets the previous value IBb as the body information IB of the occupant 5 in the current period (step 407). Thus, the control device 10 of the present embodiment is configured to take over the body information IB of the occupant 5 acquired in the previous period to the current period, thereby avoiding an occurrence of erroneous discrimination caused by a body motion of the occupant 5.

Specifically, in the body information acquisition unit 15 of the present embodiment, in the case of the body motion occurrence state VS1a, the physique determination unit 21 acquires the result of the physique determination performed in the previous period, that is, the previous value 1 phb of the physique information Iph from the previous value holding unit 28. The physique determination unit 21 of the present embodiment is configured to use the previous value 1 phb as the physique information Iph of the occupant 5 acquired in the current period to take over the determination result in the previous period to the current period.

When it is determined in step 404 that the amplitude A of the body motion waveform α is smaller than the body motion threshold value Ath (A<Ath, step 404: NO), the imaging state determination unit 27 of the present embodiment does not perform processing in steps 405 to 407. In this case, the imaging state determination unit 27 determines that "there is no large body motion" in the occupant 5 reflected in the captured image Vd (no body motion, step 408). Thus, the control device 10 of the present embodiment is configured to perform the normal imaging-state body information acquisition processing when it is determined that the imaging state VS of the occupant 5 reflected in the captured image Vd is in the normal imaging state VS0 (see FIG. 5, step 107).

In addition, in the control device 10 of the present embodiment, "luminance" of the captured image Vd is acquired as the evaluation index value Vei of the imaging state VS together with the "magnitude of body motion" of the person H. The imaging state determination unit 27 of the present embodiment is configured to determine the imaging state VS based on the "luminance" of the captured image Vd (see FIG. 5, steps 104 and 105).

That is, when the "luminance" of the captured image Vd is high, the captured image Vd is bright, and thus an image of the person H reflected in the captured image Vd may be unclear. In particular, when the captured image Vd is a monochrome image, for example, when an infrared camera is used, the image of the person H included in the captured image Vd is in a so-called "overexposed" state in which the image is displayed in white as a whole, and thus a tendency that the image of the person H becomes unclear is apt to appear more remarkably. As a result, the accuracy of detecting the skeleton points SP based on the image analysis may be reduced.

In addition, even when the "luminance" of the captured image Vd is low, the captured image Vd is dark, and thus the image of the person H reflected in the captured image Vd may be unclear. As well in this case, the image of the person H included in the monochrome captured image Vd is in a so-called "underexposed" state in which the image is displayed in black as a whole. As a result, the accuracy of detecting the skeleton points SP based on the image analysis may be reduced.

Based on this point, the imaging state determination unit 27 of the present embodiment determines the imaging state VS based on the "luminance" of the captured image Vd. When the "luminance" of the captured image Vd is "too high" or "too low", the acquisition of the body information IB based on the detection of the skeleton points SP is not performed, and thus a reduction in accuracy due to the occurrence of the erroneous discrimination can be avoided.

Specifically, as shown in FIG. 3, the imaging state determination unit 27 of the present embodiment is provided with a pixel luminance value detection unit 33 that detects a pixel luminance value L for each pixel forming the captured image Vd. Further, in the control device 10 of the present embodiment, this pixel luminance value L is used to represent the "luminance" of the captured image Vd. Further, the imaging state determination unit 27 of the present embodiment includes an overexposure determination unit 34 and an underexposure determination unit 35 that determine whether the imaging state corresponds to the specific imaging state VS1 using the "luminance" of the captured image Vd, which is represented by this pixel luminance value L, as the evaluation index value Vei of the imaging state VS.

Figure 11:
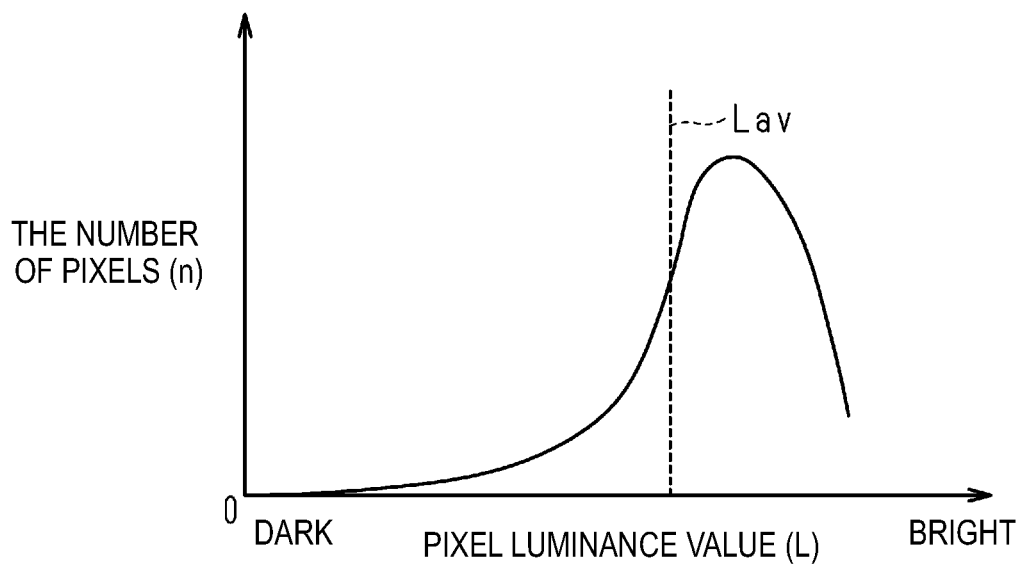
FIG. 11 is an explanatory diagram of distribution of pixel luminance values in a captured image and an average value of the pixel luminance values.
Figure 12:
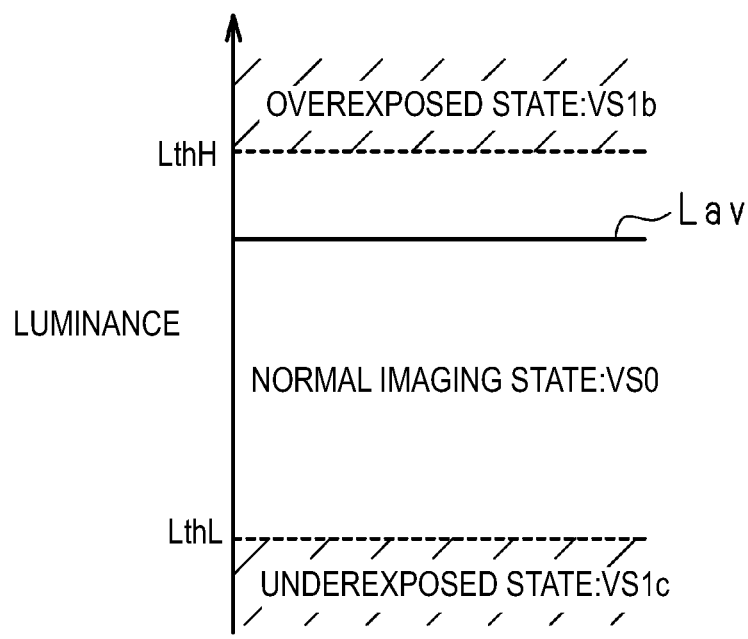
FIG. 12 is an explanatory diagram of the imaging state determination in which luminance of the captured image indicated by the average value of the pixel luminance values is used as the evaluation index value of the imaging state.

As shown in FIGS. 11 and 12, the pixel luminance value detection unit 33 of the embodiment calculates an average value Lay of pixel luminance values L as a value indicating the "luminance" of the captured image Vd. FIG. 11 is a graph showing distribution of the pixel luminance values L in the captured image Vd, in which a horizontal axis represents the pixel luminance value L while a vertical axis represents the number of pixels n. In the imaging state determination unit 27 of the present embodiment, the overexposure determination unit 34 compares the average value Lay of the pixel luminance values L output from the pixel luminance value detection unit 33 with a predetermined high luminance threshold value LthH. When the average value Lay of the pixel luminance values L is equal to or larger than the high luminance threshold value LthH, the overexposure determination unit 34 determines that the imaging state VS of the occupant 5 reflected in the captured image Vd is in an overexposed state VS1b corresponding to the specific imaging state VS1.

In addition, the underexposure determination unit 35 compares the average value Lay of the pixel luminance values L with a predetermined low luminance threshold value LthL. When the average value Lay of the pixel luminance values L is equal to or smaller than the low luminance threshold value LthL, the underexposure determination unit 35 determines that the imaging state VS of the occupant 5 reflected in the captured image Vd is in an underexposed state VS1c corresponding to the specific imaging state VS1.

Figure 13:
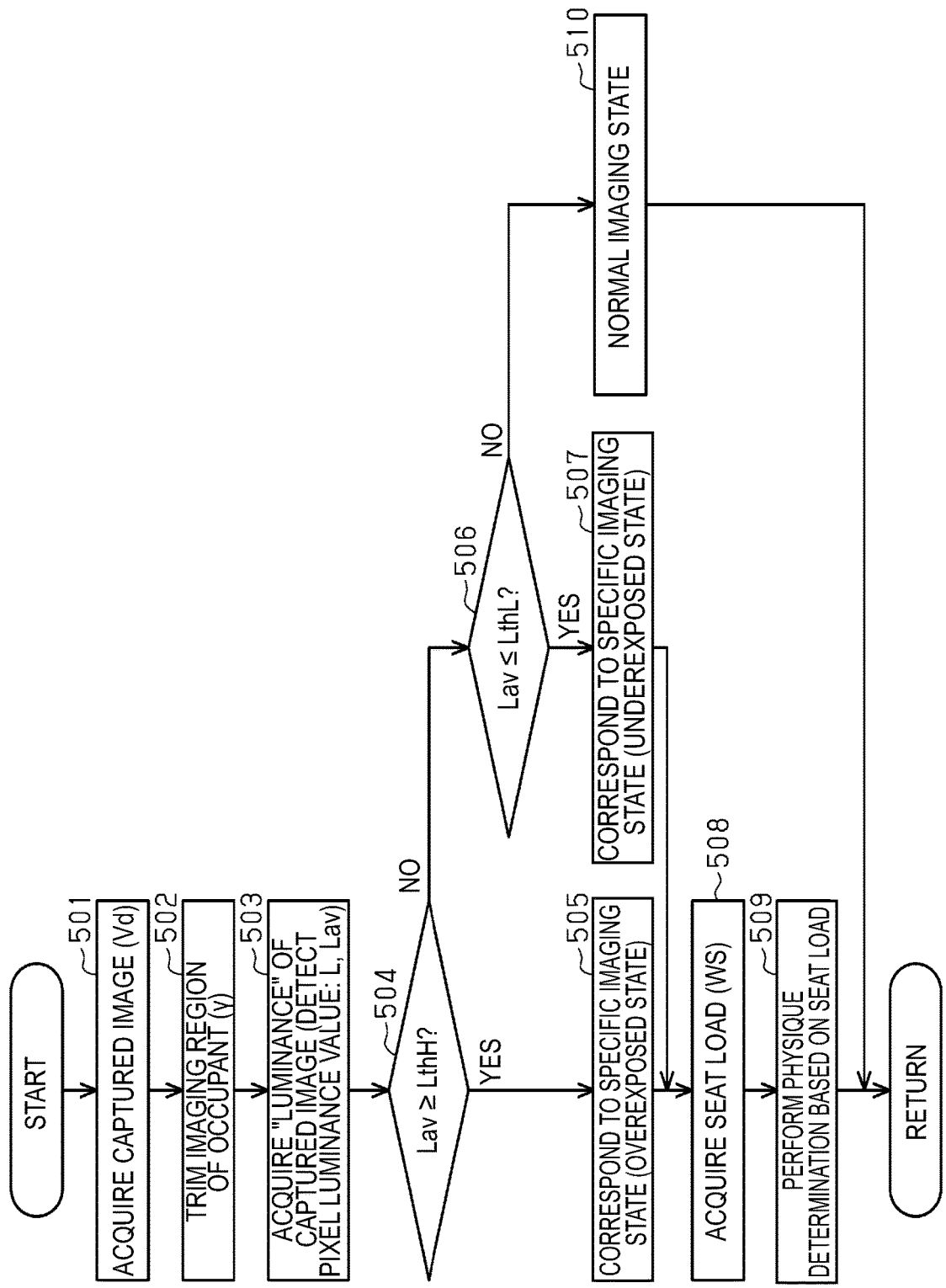
FIG. 13 is a flowchart showing processing procedures of overexposure determination and underexposure determination, as well as an example of the body information acquisition processing performed when it is determined, based on the luminance of the captured image, that the imaging state corresponds to the specific imaging state.

More specifically, as shown in FIG. 3 and a flowchart of FIG. 13, when the imaging state determination unit 27 of the present embodiment acquires the captured image Vd of the inside of the vehicle cabin 2 (step 501), the imaging state determination unit 27 trims the person H reflected in the captured image Vd, that is, an imaging region γ of the occupant 5 (step 502).

Figure 14:
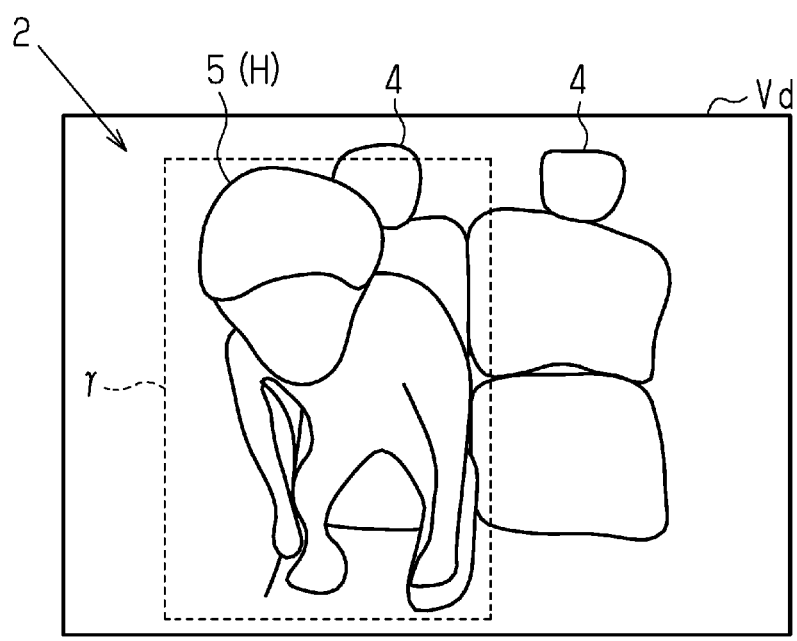
FIG. 14 is an explanatory diagram of an imaging region of the person reflected in the captured image and an imaging region obtained by trimming.

As shown in FIG. 14, in the imaging state determination unit 27 of the present embodiment, trimming processing of cutting out the imaging region γ of the occupant 5 is performed in a manner including an upper body of the occupant 5, at least a head and a body.

As shown in FIG. 3 and the flowchart of FIG. 13, in the imaging state determination unit 27 of the present embodiment, the pixel luminance value detection unit 33 detects the pixel luminance values L in the imaging region γ of the occupant 5 and calculates the average value Lay thereof. Then, the imaging state determination unit 27 of the present embodiment acquires the "luminance" of the captured image Vd in which the occupant 5 is reflected (step 503).

Next, in the imaging state determination unit 27 of the present embodiment, the overexposure determination unit 34 compares, with the high luminance threshold value LthH, the average value Lay of the pixel luminance values L calculated as the "luminance" of the captured image Vd in step 503 (step 504). When the average value Lay of the pixel luminance values L is equal to or larger than the high luminance threshold value LthH (Lay LthH, step 504: YES), the overexposure determination unit 34 determines that the imaging state VS of the occupant 5 reflected in the captured image Vd is in the overexposed state VS1b (step 505).

Further, when it is determined in step 504 that the average value Lay of the pixel luminance values L is smaller than the high luminance threshold value LthH (Lay<LthH, step 504: NO), the underexposure determination unit 35 compares the average value Lay of the pixel luminance values L with the low luminance threshold value LthL (step 506). Then, when the average value Lay of the pixel luminance values L is equal to or smaller than the low luminance threshold value LthL (Lay≤LthL, step 506: YES), the underexposure determination unit 35 determines that the imaging state VS of the occupant 5 reflected in the captured image Vd is in the underexposed state VS1c (step 507).

In the control device 10 of the present embodiment, when it is determined that the imaging state corresponds to the specific imaging state VS1 due to the overexposed state VS1b or the underexposed state VS1c, the body information acquisition unit 15 acquires the seat load WS of the occupant 5 (step 508). Then, the body information acquisition unit 15 of the present embodiment is configured to acquire the body information IB for the occupant 5 reflected in the captured image Vd based on the seat load WS (step 509).

Specifically, in the body information acquisition unit 15 of the present embodiment, in this case, the physique determination unit 21 determines the physique of the occupant 5 by comparing the seat load WS to a predetermined threshold value. Thus, the body information acquisition unit 15 of the present embodiment is configured to acquire the physique information Iph of the occupant 5.

When the average value Lay of the pixel luminance values L is between the low luminance threshold value LthL and the high luminance threshold value LthH (LthL<Lay<LthH, step 506: NO), the imaging state determination unit 27 of the present embodiment determines that the imaging state is in the normal imaging state VS0 (step 510). Thus, in the control device 10 of the present embodiment, the body information acquisition unit 15 is configured to perform the normal imaging-state body information acquisition processing, that is, the acquisition of the body information IB based on the detection of the skeleton points SP (see FIG. 5, step 107).

Next, an operation of the present embodiment will be described.

In the control device 10 functioning as the body information acquisition device 20, it is determined whether the imaging state VS of the occupant 5 reflected in the captured image Vd of the inside of the vehicle cabin 2 corresponds to the specific imaging state VS1 specified based on the predetermined evaluation index value Vei. Then, when the imaging state corresponds to such a specific imaging state VS1, the body information IB related to the occupant 5 is not acquired based on the detection of the skeleton points SP.

Next, effects of the present embodiment will be described.

(1) The control device 10 as the body information acquisition device 20 includes the skeleton point detection unit 13 that detects the skeleton points SP of the person H included in the captured image Vd. The control device 10 includes the body information acquisition unit 15 that acquires the body information IB of the person H based on the detection of the skeleton points SR. Further, the control device 10 includes the imaging state determination unit 27 that determines whether the imaging state VS of the person H reflected in the captured image Vd corresponds to the specific imaging state VS1 specified based on the predetermined evaluation index value Vei. Then, when the imaging state corresponds to the specific imaging state VS1, the body information acquisition unit 15 does not acquire the body information IB based on the detection of the skeleton points SP.

According to the above configuration, a state in which the detection accuracy of the skeleton points SP is reduced due to the imaging state VS of the person H reflected in the captured image Vd is set as the specific imaging state VS1, and in such a case, the detection of the skeleton point SP based on the image analysis can be prevented from being used for acquiring the body information IB. As a result, it is possible to avoid the occurrence of the erroneous discrimination and to acquire the body information IB of the person H with high accuracy.

(2) The imaging state determination unit 27 is provided with the body motion waveform generation unit 31 that generates the body motion waveform α of the person H reflected in the captured image Vd. Further, the imaging state determination unit 27 includes the body motion determination unit 32 that determines whether the imaging state VS of the person H corresponds to the specific imaging state VS1 using the "magnitude of body motion" expressed by the body motion waveform α as the evaluation index value Vei of the imaging state VS. Then, when the amplitude A of the body motion waveform α indicating the "magnitude of body motion" is equal to or larger than the body motion threshold value Ath (A≥Ath), the body motion determination unit 32 determines that the imaging state VS of the person H corresponds to the specific imaging state VS1.

That is, when the "magnitude of body motion" of the person H reflected in the captured image Vd is large, the accuracy of detecting the skeleton points SP based on the image analysis may be reduced. Regarding this point, according to the above configuration, the body motion occurrence state VS1a in which the "magnitude of body motion" is large is specified based on the body motion waveform α of the person H. Then, the body motion occurrence state VS1a is set as the specific imaging state VS1, the detection of the skeleton points SP based on the image analysis is not used for acquiring the body information IB, and thus the occurrence of the erroneous discrimination can be prevented.

Further, the body motion occurrence state VS1a is regarded as a precursor to larger "body motion" that the person H takes an extreme posture such as a forward lean and a twist of the upper body and deviates from the angle of view of the camera 3, and thus an accompanying reduction in determination accuracy and occurrence of the erroneous discrimination can be avoided. As a result, it is possible to acquire the body information IB of the person H with higher accuracy.

(3) The imaging state determination unit 27 is provided with the pixel luminance value detection unit 33 that detects the pixel luminance value L for each pixel forming the captured image Vd. The imaging state determination unit 27 includes the overexposure determination unit 34 that determines whether the imaging state VS of the person H corresponds to the specific imaging state VS1 using the "luminance" of the captured image Vd represented by the average value Lay of the pixel luminance values L as the evaluation index value Vei of the imaging state VS. Then, when the average value Lay of the pixel luminance values L is equal to or larger than the predetermined high luminance threshold value LthH (Lay LthH), the overexposure determination unit 34 determines that the imaging state corresponds to the specific imaging state VS1 of the person H.

That is, when the "luminance" of the captured image Vd is high, an image of the person H reflected in the captured image Vd may be unclear due to that the captured image Vd is bright. As a result, the accuracy of detecting the skeleton points SP based on the image analysis may be reduced.

Regarding this point, according to the above configuration, the "luminance" of the captured image Vd represented by the average value Lay of the pixel luminance values is set as the evaluation index value Vei of the imaging state VS, and thus the overexposed state VS1b in which the "luminance" is too high is specified. Then, the overexposed state VS1b is set as the specific imaging state VS1, the detection of the skeleton points SP based on the image analysis is not used for acquiring the body information IB, and thus the occurrence of the erroneous discrimination can be prevented.

(4) The imaging state determination unit 27 includes the underexposure determination unit 35 that determines whether the imaging state VS corresponds to the specific imaging state VS1 using the "luminance" of the captured image Vd represented by the average value Lay of the pixel luminance values L as the evaluation index value Vei of the imaging state VS. Then, when the average value Lay of the pixel luminance values L is equal to or smaller than the predetermined low luminance threshold value LthL (Lay LthL), the underexposure determination unit 35 determines that the imaging state VS of the person H corresponds to the specific imaging state VS1.

That is, when the "luminance" of the captured image Vd is low, the image of the person H reflected in the captured image Vd may also be unclear due to that the captured image Vd is dark. As a result, the accuracy of detecting the skeleton points SP based on the image analysis may be reduced.

Regarding this point, according to the above configuration, the "luminance" of the captured image Vd represented by the average value Lay of the pixel luminance values is set as the evaluation index value Vei of the imaging state VS, and thus the underexposed state VS1c in which the "luminance" is too low is specified. Then, the underexposed state VS1c is set as the specific imaging state VS1, the detection of the skeleton points SP based on the image analysis is not used for acquiring the body information IB, and thus the occurrence of the erroneous discrimination can be prevented.

(5) The imaging state determination unit 27 trims the imaging region γ of the person H reflected in the captured image Vd to determine the specific imaging state VS1 based on the "luminance" of the captured image Vd. As a result, the imaging state determination based on the "luminance" of the captured image Vd can be performed with higher accuracy for the imaging state VS of the person H reflected in the captured image Vd.

(6) The body information acquisition unit 15 acquires the physique information Iph of the occupant 5 seated on the seat 4 of the vehicle 1 as the body information IB of the person H reflected in the captured image Vd.

That is, by determining the physique information Iph of the occupant 5 based on the image analysis-based detection of the skeleton points SP, the physique of the occupant 5 can be accurately determined regardless of a seat position of the occupant such as a slide position, a reclining position, or a lift position. Even when the posture of the occupant 5 changes, the physique of the occupant 5 can be accurately determined. Further, when the imaging state is the specific imaging state VS1 in which the detection accuracy of the skeleton points SP is reduced, the detection of the skeleton points SP based on the image analysis is not used for acquiring the body information IB, and thus it is possible to avoid the occurrence of the erroneous discrimination and to acquire the physique information Iph of the occupant 5 with high accuracy.

(7) The body motion waveform generation unit 31 generates the body motion waveform α of the person H based on the time-series data DtSP of the skeleton points SP.

According to the above configuration, the body motion waveform α of the person H reflected in the captured image Vd can be generated while the skeleton points SP are detected based on the image analysis. As a result, it is possible to generate the body motion waveform α of the person H without adding a new configuration.

(8) The control device 10 includes the seat load detection unit 26 that detects the seat load WS of the occupant 5. Then, the body motion waveform generation unit 31 generates a body motion waveform of the occupant 5 based on the time-series data DtWS of the seat load WS.

According to the above configuration, it is possible to generate the body motion waveform α of the person H seated on the seat 4, that is, the occupant 5, using the load sensor 25 of the seat 4 often adopted in the vehicle 1. As a result, the body motion waveform α of the occupant 5 seated on the seat 4 can be generated while preventing addition of a new configuration.

(9) The control device 10 periodically detects the skeleton points SP by the skeleton point detection unit 13, acquires the body information IB by the body information acquisition unit 15, and determines the imaging state VS by the imaging state determination unit 27. In addition, the body information acquisition unit 15 includes the previous value holding unit 28 that holds the body information IB acquired in the previous period as the previous value IBb of the body information IB. Then, when the imaging state is the body motion occurrence state VS1a determined to correspond to the specific imaging state VS1 based on the "magnitude of body motion" reflected in the body motion waveform α, the body information acquisition unit 15 sets the previous value IBb of the body information IB as the body information IB acquired in the current period.

That is, the determination result before the accuracy of detecting the skeleton points SP based on the image analysis is reduced is used, and thus the occurrence of the erroneous discrimination can be avoided. Then, it is possible to avoid a situation in which a current value and the previous value of a state value used for determination are mixed by holding the previous value IBb of the body information IB, which is the "determination result" in the previous period.

(10) When the imaging state is the overexposed state VS1b or the underexposed state VS1c determined to correspond to the specific imaging state based on the "luminance" of the captured image Vd, the body information acquisition unit 15 acquires the body information IB of the occupant 5 based on the seat load WS. As a result, even in a state in which the accuracy of detecting the skeleton points SP based on the image analysis is reduced, the body information IB of the occupant 5 can be acquired with high accuracy.

(11) The body information acquisition unit 15 acquires the body information IB of the person H by inputting the feature values FV calculated based on the detection of the skeleton points SP into the inference model generated by the machine learning. As a result, the body information IB of the person H can be acquired with high accuracy based on the image analysis-based detection of the skeleton points SP.

(12) The body information acquisition unit 15 uses the seat load WS as the feature value FV. Thus, the body information IB of the person H can be acquired with higher accuracy based on the inference model generated by the machine learning.

The above embodiment can be modified as follows. The above embodiment and the following modifications can be performed in combination within a technically consistent range.

In the above embodiment, the feature value FV of the person H is calculated based on the positions of the skeleton points SP included in the captured image Vd, the body size indicated by the plurality of skeleton points SP, and the seat load WS of the occupant 5. Then, the feature value FV is input into the inference model generated by the machine learning, and thus the acquisition of the body information IB of the person H reflected in the captured image Vd, specifically, the physique determination of the person is performed. However, this disclosure is not limited thereto, and may be applied to a configuration in which the body information IB is acquired based on the image analysis-based detection of the skeleton points SP using a statistical method, map calculation, or the like.

In addition, a configuration in which the load sensor 25 for detecting the seat load WS is not provided may be realized. In such a configuration, when the body information IB is not acquired based on the detection of the skeleton points SP in a case where the imaging state corresponds to the specific imaging state VS1, for example, the previous value IBb of the body information IB acquired in the previous period may be set as the body information IB acquired in the current period. Then, the body motion waveform α may also be generated based on the time-series data DtSP of the skeleton points SP.

A form of the camera 3 may be freely changed, for example, a visible light camera or the like is used. An installation position may also be freely changed.

The skeleton points SP and the body size used to acquire the body information IB may be freely set.

In the above embodiment, the camera 3 provided in the vehicle 1 captures an image of the occupant 5 inside the vehicle cabin 2, specifically, the occupant 5 seated on the seat 4. A configuration in which, for the occupant 5 as the person H reflected in the captured image Vd, the body information IB is acquired based on the image analysis-based detection of the skeleton points SP is realized. However, this disclosure is not limited thereto, and may be configured to acquire the body information IB for the occupant 5 of the vehicle 1 riding in a standing posture in a ride-sharing vehicle or the like. For example, this disclosure may be applied to a configuration in which the body information IB of the person H reflected in the captured image Vd is acquired for a road or a room of a building.

In the above embodiment, the body motion occurrence state VS1a based on the "magnitude of body motion" reflected in the body motion waveform α, the overexposed state VS1b and the underexposed state VS1c based on the "luminance" of the captured image Vd are specified as the imaging state VS corresponding to the specific imaging state VS1. However, this disclosure is not limited thereto, and any one of the imaging state determination based on the "magnitude of body motion" and the imaging state determination based on the "luminance" of the captured image Vd may be performed. For the imaging state determination based on the "luminance" of the captured image Vd, the corresponding determination may be performed on only one of the overexposed state VS1b and the underexposed state VS1c. Further, the corresponding determination of one of the overexposed state VS1b and the underexposed state VS1c may be combined with the corresponding determination of the body motion occurrence state VS1a. Then, the corresponding determination of the body motion occurrence state VS1a, the overexposed state VS1b, and the underexposed state VS1c may be combined with the corresponding determination of the specific imaging state VS1 based on the evaluation index value Vei of another imaging state VS.

In the above embodiment, the trimming processing of cutting out the imaging region of the occupant 5 is performed in a manner including the upper body, at least the head and the body, of the occupant 5, and a setting range of the imaging region γ may be freely changed. A cut-out shape of the imaging region γ may be changed, for example, the imaging region γ obtained in the trimming processing is set to an elliptical shape. A plurality of imaging regions γ may be cut out. The imaging state determination may be performed based on entire "luminance" of the captured image Vd without trimming the imaging region γ of the occupant 5.

In the above embodiment, the average value Lay of the pixel luminance values is used as the value represented by the "luminance" of the captured image Vd, and a median value of the pixel luminance values or a peak value of the distribution may be used.

Next, technical ideas that can be understood from the above embodiment and modifications will be described.

(1) A body motion waveform generation unit generates a body motion waveform based on time-series data of skeleton points.

According to the above configuration, a body motion waveform of a person reflected in a captured image can be generated while the skeleton points are detected based on image analysis. As a result, it is possible to generate the body motion waveform of the person without adding a new configuration.

(2) A seat load detection unit that detects a seat load of an occupant is provided, and the body motion waveform generation unit generates the body motion waveform based on time-series data of the seat load.

According to the above configuration, it is possible to generate a body motion waveform of a person seated on a seat, that is, an occupant, using a load sensor of the seat often adopted in a vehicle. Accordingly, it is possible to generate the body motion waveform of the occupant seated on the seat while preventing addition of a new configuration.

(3) A pixel luminance value detection unit that detects a pixel luminance value for each pixel forming the captured image is provided, and an imaging state determination unit sets any one of an average value, a median value, and a peak value of pixel luminance values as luminance of the captured image. As a result, it is possible to quantitatively perform corresponding determination of a specific imaging state in which the "luminance" of the captured image is set as an evaluation index value of an imaging state.

(4) Detection of the skeleton points, acquisition of body information, and determination of the imaging state are periodically performed. A body information acquisition unit includes a previous value holding unit that holds the body information acquired in a previous period as a previous value of the body information. When the imaging state corresponds to the specific imaging state, the previous value of the body information acquired in the previous period is set as the body information acquired in a current period.

That is, a determination result before accuracy of detecting the skeleton points based on the image analysis is reduced is used, and thus an occurrence of erroneous discrimination can be avoided. Then, it is possible to avoid a situation in which a current value and the previous value of a state value used for determination are mixed by holding the previous value of the body information, which is the "determination result" in the previous period.

(5) The seat load detection unit that detects the seat load of the occupant is provided, and the body information acquisition unit acquires the body information of the person based on the seat load when the imaging state corresponds to the specific imaging state. As a result, even in a state in which the accuracy of detecting the skeleton points based on the image analysis is reduced, the body information of the occupant can be acquired with high accuracy.

(6) The body information acquisition unit acquires the body information of the person based on the seat load when it is determined that the imaging state corresponds to the specific imaging state based on the luminance of the captured image, and sets the previous value of the body information acquired in the previous period as the body information acquired in the current period when it is determined that the imaging state corresponds to the specific imaging state based on magnitude of body motion.

That is, when it is determined that the imaging state corresponds to the specific imaging state based on the magnitude of body motion, accuracy of acquiring the body information of the person based on the seat load may also be similarly reduced. Therefore, in such a case, the determination result before the accuracy of detecting the skeleton points based on the image analysis is reduced is used, and thus it is possible to avoid the occurrence of the erroneous discrimination and to acquire the body information with high accuracy.

(7) The body information acquisition unit acquires the body information of the person by inputting feature values calculated based on the detection of the skeleton points into an inference model generated by machine learning. As a result, it is possible to acquire the body information of the person with high accuracy based on the image analysis-based detection of the skeleton points.

(8) The body information acquisition unit uses the seat load as a feature value. Thus, it is possible to acquire the body information of the person with higher accuracy based on the inference model generated by the machine learning.

A body information acquisition device includes a skeleton point detection unit configured to detect a skeleton point of a person included in a captured image; a body information acquisition unit configured to acquire body information of the person based on detection of the skeleton point; and an imaging state determination unit configured to determine whether an imaging state of the person reflected in the captured image corresponds to a specific imaging state specified based on a predetermined evaluation index value, and the body information acquisition unit does not acquire the body information based on the detection of the skeleton point when the imaging state corresponds to the specific imaging state.

According to the above configuration, a state in which the detection accuracy of the skeleton points is reduced due to the imaging state of the person reflected in the captured image is set as the specific imaging state, and in such a case, image analysis-based detection of the skeleton points can be prevented from being used for acquiring the body information. As a result, it is possible to avoid an occurrence of erroneous discrimination and to acquire the body information such as a physique and a posture of the person reflected in the captured image with high accuracy.

It is preferable that the body information acquisition device includes a body motion waveform generation unit configured to generate a body motion waveform of the person, and the imaging state determination unit determines, using magnitude of body motion represented by the body motion waveform as the evaluation index value of the imaging state, that the imaging state corresponds to the specific imaging state when the magnitude of body motion is equal to or larger than a predetermined body motion threshold value.

That is, when the "magnitude of body motion" of the person reflected in the captured image is large, the accuracy of detecting the skeleton points based on the image analysis may be reduced. Regarding this point, according to the above configuration, a state in which the "magnitude of body motion" is large is specified based on the body motion waveform of the person. As a result, this state is set as the specific imaging state, the detection of the skeleton points based on the image analysis is not used for acquiring the body information, and thus the occurrence of the erroneous discrimination can be prevented.

Further, an occurrence of a body motion is regarded as a precursor to larger "body motion" that causes the person to deviate from the angle of view of the camera when the person takes an extreme posture such as a forward lean and a twist of an upper body, and thus it is possible to avoid an accompanying reduction in determination accuracy and occurrence of the erroneous discrimination in advance. As a result, the body information of the person can be acquired with higher accuracy.

In the body information acquisition device, it is preferable that the imaging state determination unit determines, using luminance of the captured image as the evaluation index value of the imaging state, that the imaging state corresponds to the specific imaging state when the luminance of the captured image is equal to or higher than a predetermined high luminance threshold value.

That is, when the "luminance" of the captured image is high, an image of the person reflected in the captured image may be unclear due to that the captured image is bright. As a result, the accuracy of detecting the skeleton points based on the image analysis may be reduced.

Regarding this point, according to the above configuration, a state in which the "luminance" is too high is specified using the "luminance" of the captured image as the evaluation index value of the imaging state. Then, such a state is set as the specific imaging state, the detection of the skeleton points based on the image analysis is not used for acquiring the body information, and thus the occurrence of the erroneous discrimination can be prevented.

In the body information acquisition device, it is preferable that the imaging state determination unit determines, using luminance of the captured image as the evaluation index value of the imaging state, that the imaging state corresponds to the specific imaging state when the luminance of the captured image is equal to or lower than a predetermined low luminance threshold value.

That is, when the "luminance" of the captured image is low, the image of the person reflected in the captured image may be unclear due to that the captured image is dark. As a result, the accuracy of detecting the skeleton points based on the image analysis may be reduced.

Regarding this point, according to the above configuration, a state in which the "luminance" is too low is specified using the "luminance" of the captured image as the evaluation index value of the imaging state. Then, such a state is set as the specific imaging state, the detection of the skeleton points based on the image analysis is not used for acquiring the body information, and thus the occurrence of the erroneous discrimination can be prevented.

In the body information acquisition device, it is preferable that the imaging state determination unit trims an imaging region of the person reflected in the captured image to determine the specific imaging state based on the luminance of the captured image.

According to the above configuration, the imaging state can be determined with higher accuracy based on the "luminance" of the captured image for the imaging state of the person reflected in the captured image.

In the body information acquisition device, it is preferable that the body information acquisition unit acquires physique information of an occupant seated on a seat of a vehicle as the body information of the person.

That is, the physique information of the occupant is determined based on the image analysis-based detection of the skeleton points, and thus the physique of the occupant can be accurately determined regardless of a seat position of the occupant, such as a slide position, a reclining position, or a lift position. Even when the posture of the occupant changes, the physique of the occupant can be accurately determined. Further, when the imaging state is the specific imaging state in which the detection accuracy of the skeleton points is reduced, the detection of the skeleton points based on the image analysis is not used for acquiring the body information, and thus it is possible to avoid the occurrence of the erroneous discrimination and to acquire the physique information of the occupant with high accuracy.

According to this disclosure, the body information of the person can be acquired with high accuracy.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A body information acquisition device comprising: processing circuitry configured to:
   detect a skeleton point of a person included in a captured image;
   generate a body motion waveform of the person;
   determine that an imaging state of the person reflected in the captured image corresponds to a normal imaging state when an amplitude of the body motion waveform is less than a threshold value;
   determine that the imaging state of the person reflected in the captured image corresponds to a specific imaging state when the amplitude of the body motion waveform is equal to or greater than a threshold value;
   acquire body information of the person based on detection of the skeleton point when the normal imaging state is determined; and
   acquire the body information of the person using a seat load detected by a load sensor and without using the skeleton point when the specific imaging state is determined.

2. A body information acquisition device comprising: processing circuitry configured to:
   detect a skeleton point of a person included in a captured image;
   determine a luminance of the captured image;
   determine that an imaging state of the person reflected in the captured image corresponds to a normal imaging state when the luminance of the captured image is less than a threshold value;
   determine that the imaging state of the person reflected in the captured image corresponds to a specific imaging state when the luminance of the captured image is equal to or greater than a threshold value;
   acquire body information of the person based on detection of the skeleton point when the normal imaging state is determined; and
   acquire the body information of the person using a seat load detected by a load sensor and without using the skeleton point when the specific imaging state is determined.

3. A body information acquisition device comprising: processing circuitry configured to:
   detect a skeleton point of a person included in a captured image;
   determine a luminance of the captured image;
   determine that an imaging state of the person reflected in the captured image corresponds to a specific imaging state when the luminance of the captured image is less than or equal to a threshold value;
   determine that the imaging state of the person reflected in the captured image corresponds to a normal imaging state when the luminance of the captured image is greater than a threshold value;
   acquire body information of the person based on detection of the skeleton point when the normal imaging state is determined; and
   acquire the body information of the person using a seat load detected by a load sensor and without using the skeleton point when the specific imaging state is determined.

4. The body information acquisition device according to claim 2, wherein
   the processing circuitry trims an imaging region of the person reflected in the captured image to determine the specific imaging state based on the luminance of the captured image.

5. The body information acquisition device according to claim 1, wherein
   the processing circuitry acquires physique information of an occupant seated on a seat of a vehicle as the body information of the person.

6. The body information acquisition device according to claim 1, wherein
   the processing circuitry is configured to
      store a previous body information in a memory that was previously acquired based on a previous skeleton point; and
   acquire the body information based on the previous body information when the specific imaging state is determined.

* * * * *